(12) United States Patent
Hera et al.

(10) Patent No.: US 9,299,337 B2
(45) Date of Patent: Mar. 29, 2016

(54) VEHICLE ENGINE SOUND ENHANCEMENT

(75) Inventors: Cristian M. Hera, Framingham, MA (US); Dennis D. Klug, West Bloomfield, MI (US)

(73) Assignee: Bose Corporation, Framingham, MA (US)

( * ) Notice: Subject to any disclaimer, the term of this patent is extended or adjusted under 35 U.S.C. 154(b) by 702 days.

(21) Appl. No.: 13/004,630

(22) Filed: Jan. 11, 2011

(65) Prior Publication Data

US 2012/0177214 A1    Jul. 12, 2012

(51) Int. Cl.
*H04R 3/02* (2006.01)
*G10K 15/02* (2006.01)

(52) U.S. Cl.
CPC ..................................... *G10K 15/02* (2013.01)

(58) Field of Classification Search
USPC ......... 381/73.1, 61, 66, 86, 71.1, 98–103, 62, 381/302, 119, 77; 700/94
See application file for complete search history.

(56) References Cited

U.S. PATENT DOCUMENTS

| | | |
|---|---|---|
| 5,237,617 A | 8/1993 | Miller |
| 5,371,802 A | 12/1994 | McDonald et al. |
| 5,418,857 A | 5/1995 | Eatwell |
| 5,469,510 A | 11/1995 | Blind et al. |
| 5,612,873 A * | 3/1997 | Ogawa ............................ 701/51 |
| 5,635,903 A | 6/1997 | Koike et al. |
| 5,687,075 A | 11/1997 | Stothers |
| 5,691,893 A | 11/1997 | Stothers |
| 5,748,748 A | 5/1998 | Fischer et al. |
| 5,835,605 A | 11/1998 | Kunimoto |
| 6,275,590 B1 | 8/2001 | Prus |
| 6,356,185 B1 | 3/2002 | Plugge et al. |
| 6,912,286 B1 | 6/2005 | Daly |
| 7,088,829 B1 * | 8/2006 | Schick et al. ................. 381/71.4 |
| 7,106,867 B2 | 9/2006 | Daly |
| 7,188,005 B2 | 3/2007 | Toba et al. |
| 7,203,321 B1 | 4/2007 | Freymann et al. |
| 7,302,062 B2 | 11/2007 | Christoph |
| 7,633,004 B2 * | 12/2009 | Isozaki et al. .................... 84/612 |
| 7,787,633 B2 | 8/2010 | Costello et al. |
| 7,876,910 B2 * | 1/2011 | Sakamoto et al. ........... 381/71.4 |
| 7,876,913 B2 | 1/2011 | Kobayashi et al. |
| 7,979,147 B1 * | 7/2011 | Dunn ............................... 700/94 |
| 8,045,723 B2 * | 10/2011 | Kobayashi et al. ............. 381/61 |
| 8,130,974 B2 | 3/2012 | Sakamoto et al. |
| 8,300,842 B2 * | 10/2012 | Vaishya ....................... 381/71.4 |

(Continued)

FOREIGN PATENT DOCUMENTS

| | | |
|---|---|---|
| CN | 101053152 A | 10/2007 |
| DE | 9005598 U1 | 7/1990 |

(Continued)

OTHER PUBLICATIONS

International Search Report and Written Opinion dated May 22, 2012 for PCT/US2012/020706.

(Continued)

*Primary Examiner* — Davetta W Goins
*Assistant Examiner* — Kuassi Ganmavo
(74) *Attorney, Agent, or Firm* — Bose Corporation

(57) ABSTRACT

An engine harmonic enhancement system. The EHE system uses multiple parameters, such as engine load, gear, number of cylinders operating, and transmission ratio, to determine EHE gains to determine EHE gain. The EHE system determines a separate EHE gain for each harmonic.

11 Claims, 11 Drawing Sheets

(56) References Cited

U.S. PATENT DOCUMENTS

| | | | |
|---|---|---|---|
| 8,320,581 B2 | 11/2012 | Hera et al. | |
| 8,499,744 B2 * | 8/2013 | Fujikawa | 123/399 |
| 2002/0136415 A1 | 9/2002 | Daly | |
| 2005/0169484 A1 * | 8/2005 | Cascone et al. | 381/61 |
| 2005/0175186 A1 | 8/2005 | Yasushi et al. | |
| 2005/0207585 A1 | 9/2005 | Christoph | |
| 2005/0213776 A1 | 9/2005 | Honji et al. | |
| 2005/0232432 A1 | 10/2005 | Yasushi et al. | |
| 2005/0259830 A1 | 11/2005 | Vaishya | |
| 2006/0177797 A1 | 8/2006 | Costello et al. | |
| 2007/0160227 A1 | 7/2007 | Kogure et al. | |
| 2007/0223728 A1 | 9/2007 | Sakamoto et al. | |
| 2008/0013752 A1 | 1/2008 | Stephens | |
| 2008/0181422 A1 | 7/2008 | Christoph | |
| 2008/0192954 A1 * | 8/2008 | Honji et al. | 381/86 |
| 2008/0273722 A1 | 11/2008 | Aylward et al. | |
| 2008/0310642 A1 | 12/2008 | Sakamoto et al. | |
| 2009/0060208 A1 | 3/2009 | Pan et al. | |
| 2010/0191429 A1 * | 7/2010 | Kuwahara et al. | 701/58 |
| 2012/0106748 A1 * | 5/2012 | Peachey et al. | 381/61 |
| 2012/0109489 A1 * | 5/2012 | Valeri et al. | 701/102 |

FOREIGN PATENT DOCUMENTS

| | | | |
|---|---|---|---|
| DE | 19746523 A1 | 5/1998 | |
| DE | 19945259 C1 | 1/2001 | |
| EP | 469023 A1 | 2/1992 | |
| EP | 528817 A1 | 3/1993 | |
| EP | 992976 A2 | 4/2000 | |
| EP | 1705644 A1 | 9/2006 | |
| EP | 1906384 A1 | 4/2008 | |
| EP | 1923865 A1 | 5/2008 | |
| GB | 2252657 A | 8/1992 | |
| GB | 2254979 A | 10/1992 | |
| GB | 2258496 A | 2/1993 | |
| GB | 2261103 A | 5/1993 | |
| GB | 2271908 A | 4/1994 | |
| GB | 2271909 A | 4/1994 | |
| GB | 2287851 A | 9/1995 | |
| GB | 2447063 A | 9/2008 | |
| JP | H01140199 A | 6/1989 | |
| JP | 2674252 A | 9/1991 | |
| JP | 1990158296 A | 2/1992 | |
| JP | H04178698 A | 6/1992 | |
| JP | 1991203495 A | 2/1993 | |
| JP | 3625073 A | 12/1995 | |
| JP | 3362577 A | 3/1997 | |
| JP | H09081171 A | 3/1997 | |
| JP | 10083187 A | 3/1998 | |
| JP | 11296185 A | 10/1999 | |
| JP | 2001-282263 A | 10/2001 | |
| JP | 3261128 | 2/2002 | |
| JP | 2006-193002 A | 7/2006 | |
| JP | 2006301598 A | 11/2006 | |
| JP | 2007-259186 A | 10/2007 | |
| JP | 2007256841 A | 10/2007 | |
| JP | 2008176169 A | 7/2008 | |
| JP | 2008213760 A | 9/2008 | |
| JP | 2008216783 A | 9/2008 | |
| JP | 2009031428 A | 2/2009 | |
| JP | 2009063968 A | 3/2009 | |
| WO | 9013109 A1 | 11/1990 | |
| WO | 9208225 A1 | 5/1992 | |
| WO | 2007016527 A1 | 2/2007 | |
| WO | 2008090337 A2 | 7/2008 | |
| WO | WO 2010000532 A2 * | 1/2010 | |

OTHER PUBLICATIONS

International Search Report and Written Opinion dated May 11, 2011 for PCT/US2011/024673.
First Office Action dated Nov. 5, 2013 for Japanese Patent Application No. 2012-555031.
First Office Action dated Jul. 8, 2014 for Japanese Patent Application No. 2013-549483.
First Office Action dated Jul. 24, 2014 for Chinese Patent Application No. 2012-80009917.7.
First Office Action dated Jan. 29, 2014 for Chinese Patent Application No. 201180011962.1.
Second Office Action dated Jun. 30, 2014 for Chinese Patent Application No. 201180011962.1.
Final Office Action dated Aug. 26, 2014 for Japanese Patent Application No. 2012-555031.
International Preliminary Report on Patentability dated Sep. 13, 2012 for PCT/US2011/024673.
International Preliminary Report on Patentability dated Jul. 25, 2013 for PCT/US2012/020706.
Second Office Action dated Mar. 17, 2015 for Japanese Patent Application No. 2013-549483.

* cited by examiner

VEHICLE ENGINE SOUND ENHANCEMENT

BACKGROUND

This specification describes a vehicle engine sound enhancement system. Engine sound enhancement systems provide enhanced sound to modify the sonic and/or vibratory experience of a vehicle driver or a vehicle occupant. In a hybrid vehicle, the sound enhancement system may provide to the driver a constant sonic experience, despite changes from internal combustion power to electric motor power and to smooth the transition of the engine sound during changes. An engine sound enhancement system may allow the occupants to experience the engine sound at a loud, stimulating, level, without being annoyingly loud to persons outside the vehicle.

For further background, reference is made to U.S. patent application Ser. No. 12/716,887.

SUMMARY

In one aspect of the specification, a method includes providing a fundamental frequency corresponding to the RPM of an engine of a vehicle, determining a plurality of harmonics of the fundamental frequency, and determining an engine harmonic enhancement gain for at least one of the plurality of harmonics that is different from the engine harmonic enhancement gains corresponding to the other harmonics. The determining an engine harmonic enhancement gain may include separately determining an engine harmonic gain for each harmonic. The determining an engine harmonic gain may include determining the engine load. The determining the engine load may include one of determining the accelerator pedal position, determining the mass air flow, determining the manifold absolute pressure, or determining the engine torque. The determining of an engine harmonic gain for the at least one of the plurality of harmonics further may include determining the value of a parameter other than the engine load related to an operating condition of a vehicle, and responsive to the value of the parameter and the engine load, determining the engine harmonic enhancement gain. The circuitry for determining of an engine harmonic gain for at least one of the plurality of harmonics may include determining the value of a first parameter related to an operating condition of a vehicle, determining the value of a second parameter, different from the first parameter, related to an operating condition of the vehicle, and responsive to the value of the first parameter and the second parameter, determining the engine harmonic enhancement gain. The first parameter may be the gear in which the vehicle is operating. The first parameter may be the number of cylinders that are operating. The first parameter may be the transmission ratio of a continuously variable transmission. The determining may include selecting an engine enhancement gain from a look up table.

In another aspect of the specification, an engine harmonic enhancement system includes circuitry for providing a fundamental frequency corresponding to the RPM of the engine, circuitry for determining a plurality of harmonics of the fundamental frequency, and circuitry for determining an engine harmonic enhancement gain for at least one of the plurality of harmonics that is different from the engine harmonic enhancement gains corresponding to the other harmonics. The circuitry for determining an engine harmonic enhancement gain may include circuitry for separately determining an engine harmonic gain for each harmonic. The circuitry for determining an engine harmonic gain may include circuitry for determining the engine load. The circuitry for determining the engine load may include one of circuitry for determining the accelerator pedal position, circuitry for determining the mass air flow, circuitry for determining the manifold absolute pressure, or circuitry for determining the engine torque. The circuitry for determining and engine harmonic gain further may include circuitry for determining the value of a parameter other than the engine load related to an operating condition of a vehicle. The circuitry for determining of an engine harmonic gain for at least one of the plurality of harmonics may include circuitry for determining the value of a first parameter related to an operating condition of a vehicle, circuitry for determining the value of a second parameter related to an operating condition of the vehicle, different from the first parameter, and circuitry responsive to the value of the first parameter and the second parameter, for determining an engine harmonic enhancement gain. The first parameter may be the gear in which the vehicle is operating. The first parameter may be the number of cylinders that are operating. The first parameter may be the transmission ratio of a continuously variable transmission.

In another aspect of the specification, a method includes determining the value of a first parameter related to an operating condition of a vehicle, determining the value of a second parameter, different from the first parameter, related to an operating condition of the vehicle, and responsive to the value of the first parameter and the second parameter, determining an engine harmonic enhancement gain. The determining the engine harmonic enhancement gain may include determining separately an engine harmonic enhancement gain corresponding to each of the plurality of harmonics of the fundamental engine frequency. The engine harmonic gain corresponding to at least one of the harmonics may be different that the engine harmonic gains corresponding to the other harmonics. The method may further includes applying to the fundamental engine frequency and to each of the plurality of harmonics of the fundamental engine frequency a corresponding engine harmonic enhancement gain. The first parameter may be the gear in which the vehicle may be operating. The parameter may be the number of cylinders that are operating. The parameter may be the transmission ratio of a continuously variable transmission. The second parameter may be the engine load.

In another aspect of the specification, an apparatus includes circuitry for determining the value of a first parameter related to an operating condition of a vehicle, circuitry for determining the value of a second parameter related to an operating condition of the vehicle, different from the first parameter, and circuitry responsive to the value of the first parameter and the second parameter, for determining an engine harmonic enhancement gain. The circuitry for determining the engine harmonic enhancement gain may include circuitry for determining separately an engine harmonic gain corresponding to each of the plurality of harmonics of the fundamental engine frequency. The engine harmonic gain corresponding to at least one of the harmonics may be different that the engine harmonic gains corresponding to the other harmonics. The apparatus may further include circuitry for applying to the fundamental engine frequency and to each of the plurality of harmonics of the fundamental engine frequency a corresponding engine harmonic enhancement gain. The apparatus of claim 4 first parameter may be the gear in which the vehicle is operating. The first parameter may be the number of cylinders that are operating. The first parameter may be the transmission ratio of a continuously variable transmission. The second parameter may be the engine load.

Other features, objects, and advantages will become apparent from the following detailed description, when read in connection with the following drawing, in which:

DETAILED DESCRIPTION

Figure 1:
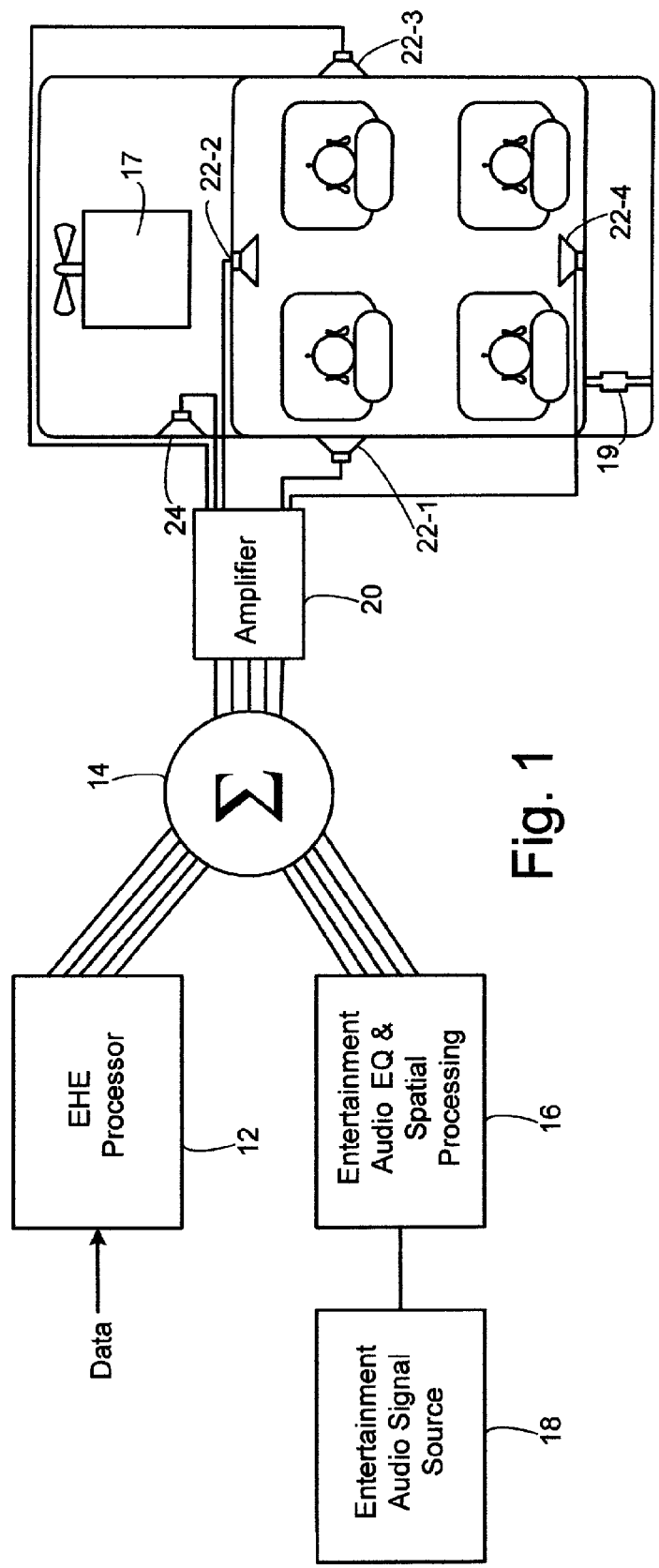
FIG. 1 is a block diagram of a vehicle including a vehicle engine sound enhancement system.

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Operations may be performed by analog circuitry or by a microprocessor executing software that performs the mathematical or logical equivalent to the analog operation. Unless otherwise indicated, signal lines may be implemented as discrete analog or digital signal lines, as a single discrete digital signal line with appropriate signal processing to process separate streams of audio signals, or as elements of a wireless communication system. Some of the processes may be described in block diagrams. The activities that are performed in each block may be performed by one element or by a plurality of elements, and may be separated in time. The elements that perform the activities of a block may be physically separated. One element may perform the activities of more than one block. Unless otherwise indicated, audio signals or video signals or both may be encoded and transmitted in either digital or analog form; conventional digital-to-analog or analog-to-digital converters may be omitted from the figures.

FIG. 1 is a block diagram of a vehicle including a vehicle engine sound enhancement system. An engine harmonic enhancement (EHE) processor 12 is coupled to a summer 14. The summer 14 may be implemented as a plurality of summers, as will be shown in subsequent figures. Also coupled to the summer 14 by an entertainment audio equalizer and spatial processor 16 is an entertainment audio signal source 18. The summer 14 is coupled through a multi-channel amplifier 20 to a number of loudspeakers 22-1-22-4 positioned about the vehicle cabin, and in some implementations may be positioned, for example as loudspeaker 24 to radiate acoustic energy to the exterior of the vehicle. The operational coupling between the engine harmonic audio signal source and the EHE EQ and spatial processor is indicated by a single line. The couplings between the EHE processor 12, the entertainment audio equalizer and spatial processor 16, the summer 14, and the amplifier 20 may be multichannel, as indicated by the multiple lines. As stated above, signal lines may be implemented as discrete analog or digital signal lines, as a single discrete digital signal line with appropriate signal processing to process separate streams of audio signals, or as elements of a wireless communication system.

In operation, the entertainment audio source 18 and entertainment audio equalizer and spatial processor 16 operate conventionally, to provide equalized and spatially processed audio entertainment to the occupants of the vehicle cabin. In some implementations, the entertainment audio signal source can include announcement audio signals, for navigation, warning signals, and the like. The EHE audio signal source provides signals representing synthetically created or recorded engine sounds of harmonic frequencies related to the engine speed, typically referenced in revolutions per minute (RPM). The EHE processor 12 processes the EHE audio signals so that, when reproduced by the loudspeakers 22-1-22-4 and 24 they provide a desired sonic experience. For example, it may be desired for the sound corresponding to EHE audio signals to appear to come from either a front engine bay 17 or a rear exhaust pipe 19. The processed EHE audio signals and the processed entertainment audio signals are summed at summer 14, amplified by amplifier 20 and transduced to acoustic energy by the loudspeakers 22-1-22-4 and 24.

Figure 2:
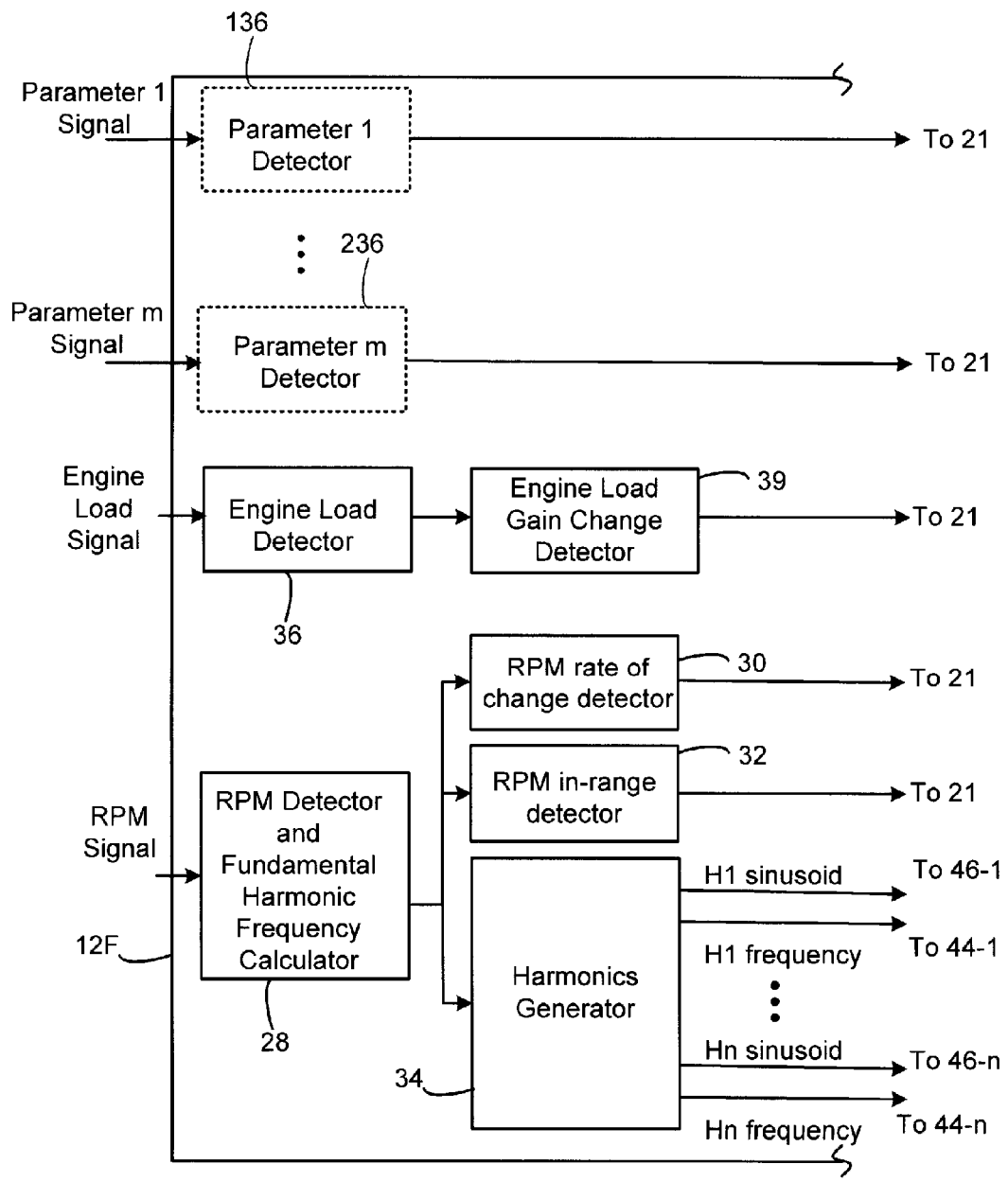
FIG. 2 is block diagram of a front end of an engine harmonic enhancement (EHE) processor.

FIG. 2 is block diagram of the front end 12F of an EHE processor, in greater detail. An RPM detector and fundamental frequency calculator 28 receives as input a signal indicative of the engine speed in RPM. The RPM detector and fundamental frequency calculator 28 is operationally coupled to an RPM rate of change detector 30, an RPM in-range detector 32, and a harmonics generator 34. An engine load detector 36 receives as input a signal indicative of engine load and is operationally coupled to an engine load gain change detector 39. If it is desired for parameters other than the engine load to affect the EHE gain, parameter detectors, represented by elements 136 and 236 may receive a signal indicative of the value of the parameter. Parameters will be discussed more completely below.

In operation, the RPM signal that is input to the RPM detector and fundamental frequency calculator 28 determines the fundamental frequency of the engine harmonics and the engine load signal controls the overall sound level of the harmonic enhancement. "Harmonics" as used herein can include half harmonics or quarter harmonics, and for simplicity includes the fundamental frequency. The RPM signal can be an analog signal over a wire or a digital signal over a bus (GMLAN, CAN, MOST, etc.). In one implementation, the RPM signal indicates a known number of pulses per engine revolution. If the RPM signal comes from an ignition module, the number of pulses per revolution (PPR) is usually equal to the number of engine cylinders which fire each revolution or half of the total number of active engine cylinders since only half of a conventional (four-stroke) engine's cylinders fire each revolution. For example, an ignition-based RPM signal from an 8 cylinder engine will have 4 PPR. If the RPM comes from a crankshaft sensor the number of pulses is equal to the number of equally-spaced teeth on the crankshaft position wheel, not including special teeth used to indicate crank position, typically to indicate the top-dead-center (TDC) position of the crankshaft.

The RPM detector and fundamental harmonic frequency calculator 28 measures the time between successive RPM pulses, and computes the reciprocal to determine the fundamental engine harmonic frequency. To reject TDC pulses or errors in RPM detection, the detector may replace a new pulse period with, for example, a previous pulse period if the new pulse period is greater than a predetermined tolerance (e.g. +/−25%) of the previously accepted pulse period.

The engine load detector 36 determines the inherent engine sound level to properly balance the sound enhancement. A signal representing engine load is well suited for controlling sound enhancement level for at least two reasons. First, overall engine noise levels increase monotonically with increasing positive engine loads. Second, strong enhancement is typically desirable only for positive engine loads, when the engine propels the transmission. Negative engine loads occur when the transmission propels the engine, also known as engine brake. While there may be high levels of inherent engine noise for during engine brake, noise cancellation may be desired for this situation but significant sound enhancement is rarely desired.

A vehicle's Engine Control Unit (ECU) will typically have available several of the following signals which correlate well with the engine load and may be available to the EHE system either in analog or digital form, for example, accelerator pedal position (APP); throttle position sensor (TPS); mass air flow (MAF); manifold absolute pressure (MAP); engine torque; and/or computed engine load. Any one of these signals is suitable for EHE control if there is sufficiently-close-to one-to-one relationship between that signal and the desired sound level of the harmonic enhancement.

The engine load detector 36 may convert the engine load signal from a native data form to a form more useful to the EHE system. For example, if the engine load signal is representative of the engine torque, the engine load detector may convert the torque measurement to an engine load measurement. The engine load may be expressed as an index; for example, the maximum engine load may be designated as 100 and the engine load may be expressed as number from 1-100. Likewise, the parameter detectors 126, 236 may convert parameter value signals from a native form into a form more useful by the EHE system.

The RPM rate of change detector 30 detects the rate of change of the RPM. An engine should emit pleasant, audible, powerful sounds as aural feedback only when a driver requires significant amounts of power from it. Such usage is usually coupled with both markedly increasing engine load and RPM. Under other engine load conditions the engine should be quieter. When a vehicle is cruising on a level highway both engine load and RPM are generally steady. During vehicle deceleration at a fixed transmission gear, both engine load and RPM drop. Therefore, the RPM rate of change detector 30 may cause the EHE system to be turned off, for example whenever the change in RPM is either small or decreasing. There may be other situations in which the RPM rate of change detector causes the EHE system to operate differently, for example when a RPM rate of change associated with "double clutching" is detected.

The RPM in-range detector 32 determines if the fundamental engine rotation frequency is below a minimum frequency threshold or above a maximum frequency threshold that determine a range of RPM within which the EHE system is designed to operate.

The engine load gain change detector 39 determines whether the engine load is increasing or decreasing and may determine the rate at which the engine load is increasing or decreasing. Generally, a more realistic effect is attained if the amplitude of the EHE signal tracks the engine load if the engine load is increasing, but decreases more gradually than the engine load if the engine load is decreasing.

The harmonics generator 34 determines and outputs two parameters for each enhanced engine harmonic (which could be a non-integer harmonic). To determine a first parameter, the harmonics generator 34 computes the frequency for each enhanced harmonic by multiplying the fundamental engine rotation frequency by the order of each enhanced engine harmonic and outputs a sinusoid signal at the frequency. To determine a second parameter, the harmonics generator converts the fundamental frequency into an index to the harmonic shape, that is, it determines a sound pressure level (SPL) for each harmonic as the SPL varies with RPM. Typically, the harmonic shape is expressed as a Look-Up Table (LUT). Alternatively, the harmonic shape may be calculated or approximated according to a formula.

Figure 3A:
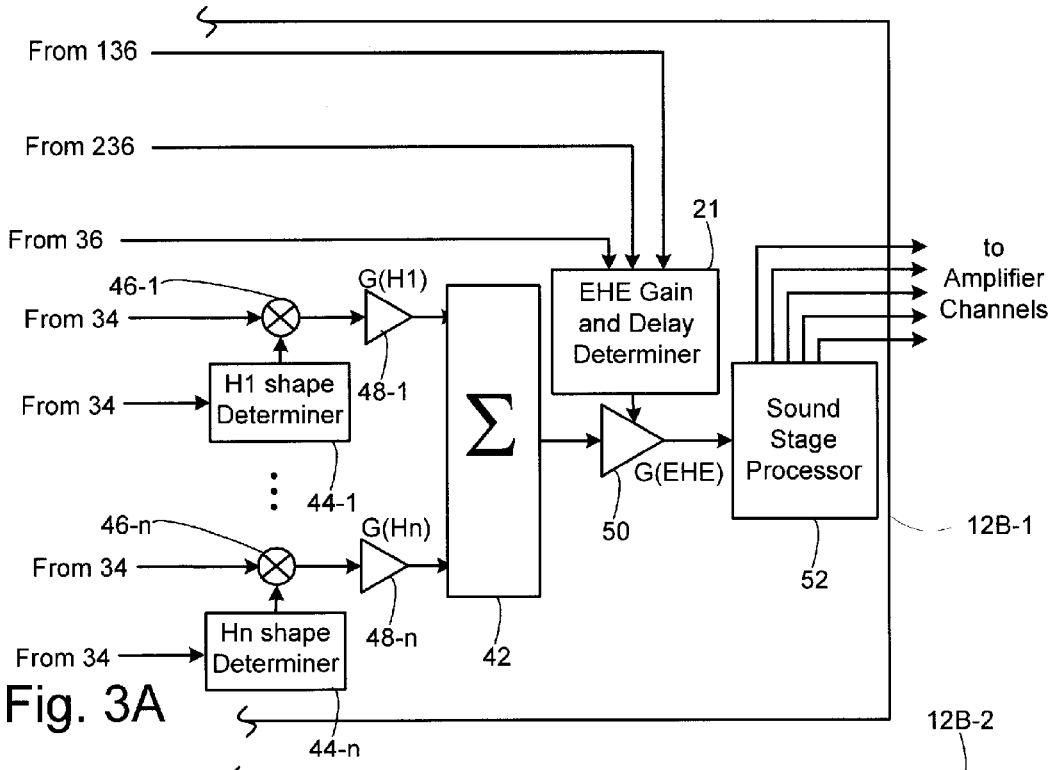
FIGS. 3A-3C are block diagrams of back ends of an EHE processor.

FIG. 3A is a block diagram of the back end 12B-1 of an EHE processor. An EHE gain and delay determiner 21 is operationally coupled to receive input from the RPM rate of change detector 30 (not shown in this figure), the engine load detector 36 and the RPM in-range detector 32 (not shown in this figure) and to output a signal to overall enhancement gain 50. Additionally, the EHE gain and delay determiner 21 is operationally coupled to the parameter signal sources here designated parameter 1 signal 126 . . . parameter n signal 236. Overall enhancement gain 50 is coupled to sound stage processor 52. H1 shape determiner 44-1 . . . Hn shape determiner 44-n are operationally coupled to the harmonics generator 34 of FIG. 2. Multipliers 46-1 . . . 46-n are operationally coupled to corresponding harmonic shape determiners 44-1 . . . 44-n, to the harmonics generator 34 of the engine harmonic audio signal source 10 of FIG. 2, and to a corresponding harmonic gain 48-1 . . . 48-n. Harmonic gains 48-1 . . . 48-n are operationally coupled to harmonics summer 42.

A "parameter," as used herein refers to a condition or measurement which is desired to affect the gain or delay of the EHE signal. Examples of parameters include the gear in which the vehicle is operating; the transmission ratio or transmission ratio interval of a continuously variable transmission (CVT); and an "operational mode" of the engine. For example, if the engine is capable of running on all cylinders or a subset of cylinders (such as an 8 cylinder engine is designed to run on 8, 6, or 4 cylinders), the "operational mode" could refer to the number of cylinders which are operating. Operational modes could also be used to provide a different sonic experience for the same vehicles or similar vehicles, depending on the wishes of the manufacturer or user. For example, a vehicle may have a sports sedan model with a sonic profile different from the profile of a touring sedan model. Operational modes could also designate whether a hybrid car is operating on electric or internal combustion power. For example, the gear in which the vehicle is operating, the transmission ratio, or the operational mode of the vehicle is typically available on the bus mentioned below in the discussion of the RPM signal. If the vehicle does not have a bus, the parameter detector may derive the information from available information; for example, the gear in which the vehicle is operating may be inferred from the vehicle velocity and the RPM.

The harmonic shape determiners 44-1-44-n of FIG. 3A are typically implemented as frequency-to-gain look-up tables (LUTs) which enables the sound level of each enhanced harmonic to be frequency dependent. Alternatively, the harmonic shape may be calculated or approximated according to a formula. This shape control outputs a gain which adjusts the harmonic enhancement level. The resulting enhancement, output through the speakers and acoustically summed with the inherent harmonic sound level, produces a sound level which matches a desired target. The gain for each harmonic can be zero (indicating that there is no enhancement at that harmonic) or unity. To achieve this goal, the look-up table must account for the inherent harmonic level, the target harmonic level, and the transfer function of the audio system, all ideally measured at the occupant's ears. The look-up tables should have enough frequency resolution such that sound level values interpolated between adjacent frequency indices satisfy desired enhancement requirements and not cause enhancement artifacts due to too-coarse frequency spacing. For computational efficiency all the harmonic shape LUT's may use the same frequency indices, usually based on the first harmonic of the engine RPM. If so, then all shape LUT's will have the same number of entries. Assuming this is the case, the highest order EHE harmonic will dictate the required number of LUT entries because it will cover the greatest range of frequencies for a given RPM range. For example, a first order harmonic will cover a 90 Hz range (10 to 100) for a RPM range from 600 to 6000, while a tenth order harmonic will cover 900 Hz for the same RPM range.

The harmonic gains 48-1 . . . 48-*n* apply individual harmonic specific gains to each of the harmonics, based on input from the harmonic shape LUT's 44-1-44-*n* and the instantaneous values of the sinusoids for each of the harmonic frequencies determined by the harmonics generator 34.

The EHE gain and delay determiner 21 determines the amount of gain and delay to be applied by the EHE overall enhancement gain 50. The EHE gain and delay determiner may apply a gain function (also referred to as a "mapping function" or "mapping") which includes as variables the engine load, the change in engine load, the RPM, and the rate of change in RPM to determine the EHE gain (as described in U.S. patent application Ser. No. 12/716,887). Additionally, the gain function applied by the EHE gain and delay determiner 21 may use as variables values of other parameter which are received from sources such as parameter 1 detector 136 . . . parameter m detector 236. The EHE gain and delay determiner 21 may smooth the gain values so that the sound variation is natural, and undistorted, similar to the sound variation in time of a mechanical system.

The overall enhancement gain 50 can change the overall sound level of individual harmonics without changing the frequency-dependent "shape" of the enhancement.

The sound stage processor 52 processes the summed-and-scaled EHE signal to provide the acoustic imaging of the sound enhancement system. The sound stage processor processes the EHE signal through a separate audio equalization filter for each loudspeaker 22-1-22-4 and 24 of FIG. 1. The EHE signal can be monophonic, indicating that the same signal is provided to all loudspeakers 22-1-22-4, or may be multichannel, for example sterophonic. In one implementation, the outputs to one or more of loudspeakers 22-1-22-4 are phase shifted relative to the other outputs to the other loudspeakers. The audio equalization filters control the magnitude and phase response as a function of frequency, and delays. Besides the conventional entertainment audio equalization and spatial imaging tuning techniques, sound stage processor 52 may also adjust the gain and even turn off certain EHE speakers over certain frequency ranges to achieve the desired sonic imaging. Because EHE imaging requirements are usually different from the requirements for entertainment audio at least some of the EHE equalization components may be separate from the entertainment audio equalization. The sound stage processor 52 operates on the EHE signal to achieve not only the desired amplitudes of the desired harmonics, but also to achieve the desired apparent source of the engine harmonics, for example the engine bay 17 or the muffler 19 of FIG. 1.

An EHE EQ and spatial processor according to FIG. 3A permits a number of parameters, in addition to engine load, to affect the EHE enhancement signal. Permitting parameters in addition to the engine load provides a more realistic sonic experience.

Figure 3B:
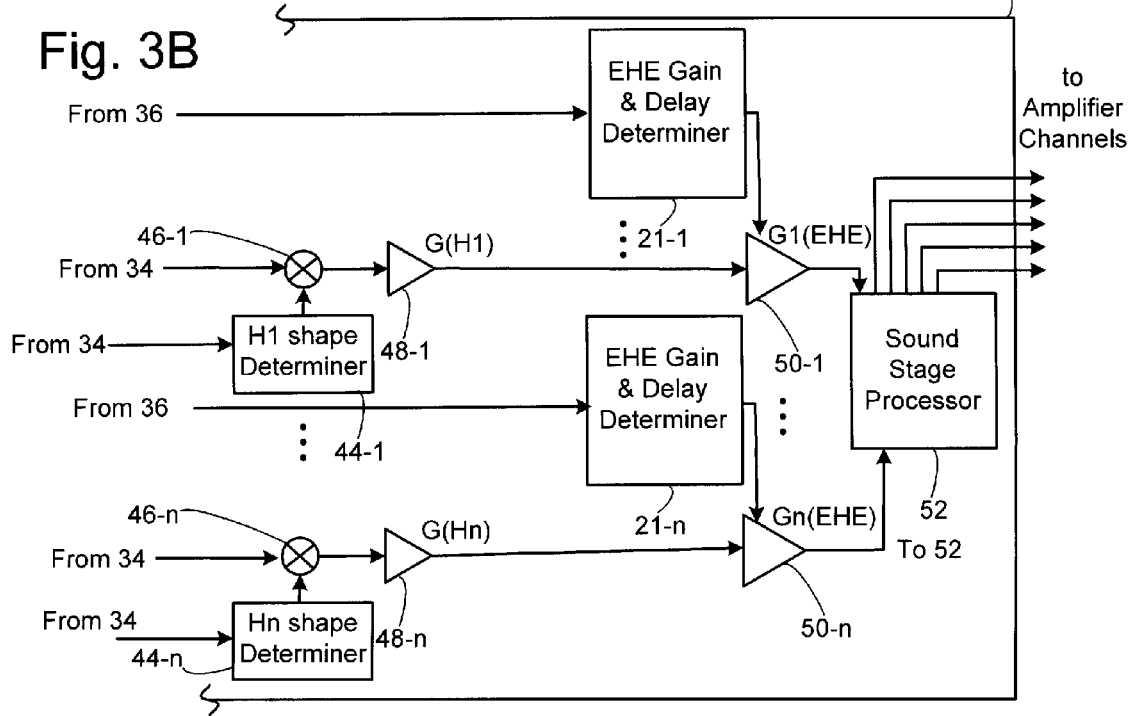

The back end 12B-2 of the EHE processor of FIG. 3B does not have the harmonics summer 42, the overall enhancement gain 50 or the EHE gain and delay determiner 21 of FIG. 3A. Instead, the back end 12B-2 of the EHE processor of FIG. 3B has separate gains 50-1-50-*n*, and separate EHE gain and delay determiners 21-1-21-*n*, one for each harmonic. The gain for each harmonic can be zero (indicating that there is no enhancement at that harmonic) or unity. The individual gain and delay determiners may determine or approximate the EHE gain by calculation or may retrieve the EHE gain from a lookup table. Data from the engine load gain determiner can be used to provide a different harmonic shape depending on the engine load.

In operation, each EHE gain and delay determiner 21-1-21-*n* receives input from the engine load detector 36. Based on the input from the engine load detector 36, each EHE gain and delay determiner 21-1-21-*n* determines a gain to be applied by corresponding gain 50-1-50-*n*. Additionally, the EHE gain determiners 21-1-21-*n* may use the change in engine load, the RPM, and the rate of change in RPM to determine the EHE gain (similar to the manner described in U.S. patent application Ser. No. 12/716,887).

The back end 12B-2 of the EHE processor of FIG. 3B permits the EHE system to allow the engine load to affect the individual harmonics differently, thereby permitting finer control of the EHE signal.

Figure 3C:
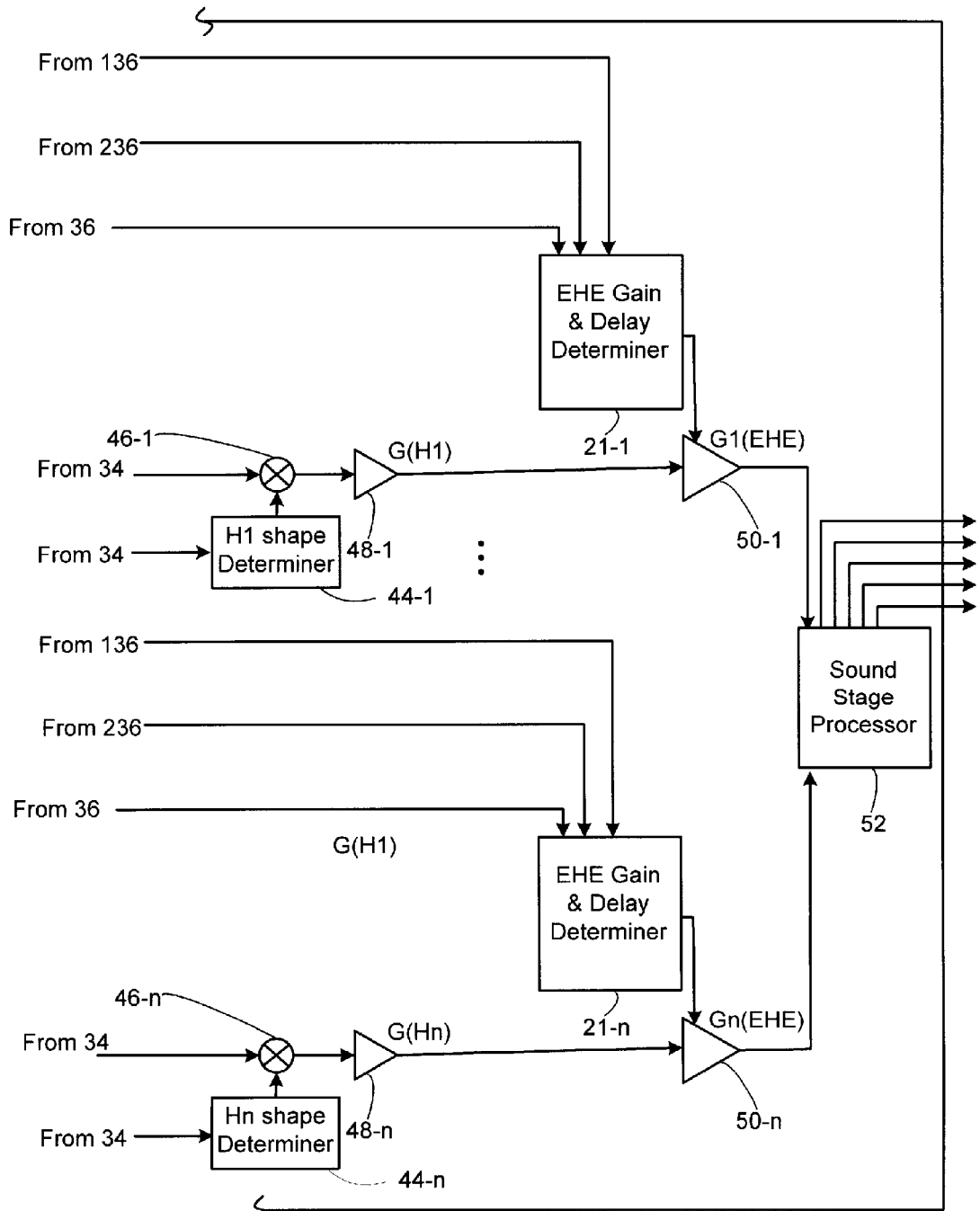

The back end 12B-3 of the EHE processor of FIG. 3C has elements of both EHE processor back ends 12B-1 and 12B-2 of FIGS. 3A and 3B, respectively, including separate gains 50-1-50-*n*, and separate EHE gain and delay determiners 21-1-21-*n*, one for each harmonic, similar to FIG. 3B. Each of the EHE gain and delay determiners 21-1 . . . 21-*n* receives inputs from the engine load detector 36, and also the parameter gain determiners such as parameter 1 detector 136 . . . parameter m detector 236. The individual gains gain and delay determiners may determine the EHE gain by calculation or may retrieve the EHE gain from a lookup table. The gain for each harmonic can be zero (indicating that there is no enhancement at that harmonic) or unity.

The back end 12B-3 of the EHE processor of FIG. 3C permits multiple parameters to affect the EHE gain, and permits each of the multiple parameters to affect each harmonic differently.

Figure 4A:
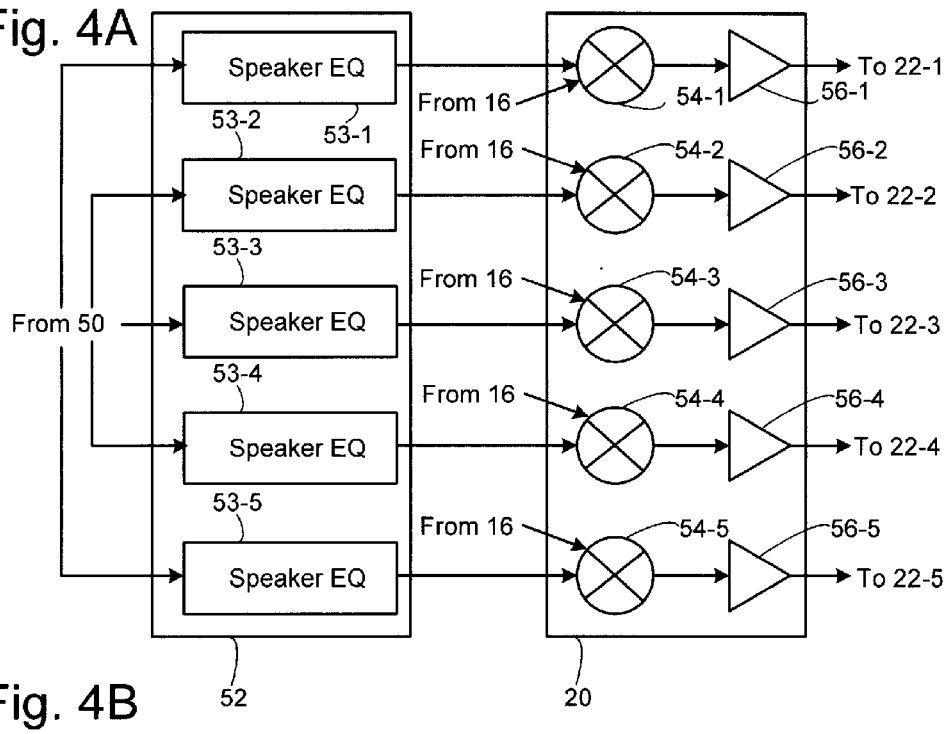
FIGS. 4A and 4B are block diagrams of a sound stage processor and an amplifier

A sound stage processor 52 and the amplifier 20 are shown in more detail in FIG. 4A. The sound stage processor 52 includes a plurality of equalizers (EQs) 53-1-53-5, one for each speaker. The amplifier 20 includes a plurality of summers 54-1-54-5 and a plurality of channel amplifiers 56-1-56-5 both one for each speaker. In some examples the number of equalizers may be greater or less than the actual number of speakers, and equalize the signal according to a set of ideal speaker locations. The equalized outputs are re-mixed to match the actual number of speakers, either by an additional stage of the sound stage processor 52 or by processing within the amplifier 20.

In operation, each of the speaker EQs 53-1-53-5 applies an equalization, which can include amplitude (which can include turning off the speaker) and phase adjustment and application of delay to the signal from the overall enhancement gain 50. The individually equalized signals from the speaker EQs 53-1-53-5 are summed in the amplifier at the summers 54-1-54-5 with the signals from the entertainment audio system intended for the corresponding speaker, and the summed signals are amplified by the channel amplifiers 56-1-56-5. The amplified channels signals are then transmitted to the loudspeakers 22-1-22-4 and 24, which transduce the audio signals to sound.

Figure 4B:
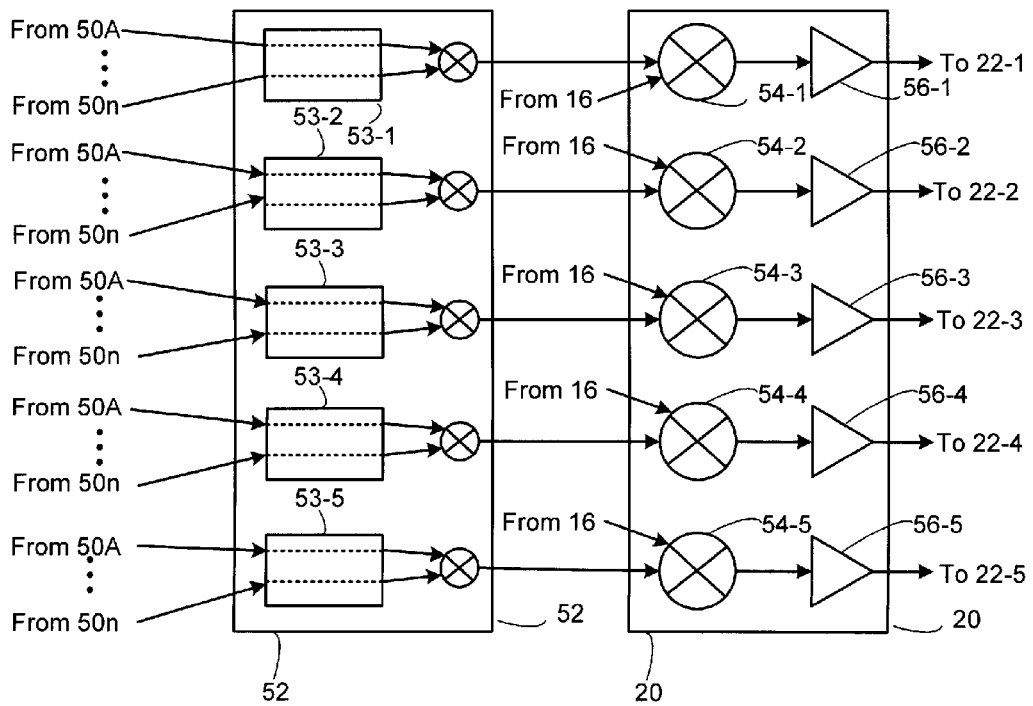

FIG. 4B shows a sound stage processor 52 for use in the back end 12B-2 and 12B-3 of FIG. 3B and FIG. 3C, respectively. The sound stage processor 52 of FIG. 4B processes the summed-and-scaled EHE signals from overall enhancement gains 50A-50n to determine an acoustic imaging for each of the harmonics. The sound stage processor separately processes each of the EHE signals from overall enhancement gains 50A-50n through separate audio equalization filters 53-1-53-5 for each loudspeaker 22-1-22-4 and 24 of FIG. 1. Each equalization filter 53-1-53-5 may apply a different equalization to the EHE signals from the overall enhancement gains 50A-50n, as represented by the separate paths in dashed lines through the equalization filters 53-1-53-5. The equalization paths are summed after equalization and provided to the amplifier 20. The audio equalization filters control the magnitude and phase response as a function of frequency, and delays. Besides the traditional entertainment audio equalization and spatial imaging tuning techniques, sound stage processor 52 may also adjust the gain and even turn off certain EHE speakers over certain frequency ranges to achieve the desired sonic imaging. Because EHE imaging requirements are usually different from that for entertainment audio at least some of the EHE equalization components may be separate from the entertainment audio equalization. The sound stage processor 52 operates on the EHE signal to achieve not only the desired amplitudes of the desired harmonics, but also to achieve the desired apparent source for each of the sets of engine harmonics. For example, the source of the higher end harmonics could be the engine bay 17 and the source of the lower order harmonics could be the muffler 19 of FIG. 1.

Figure 5A:
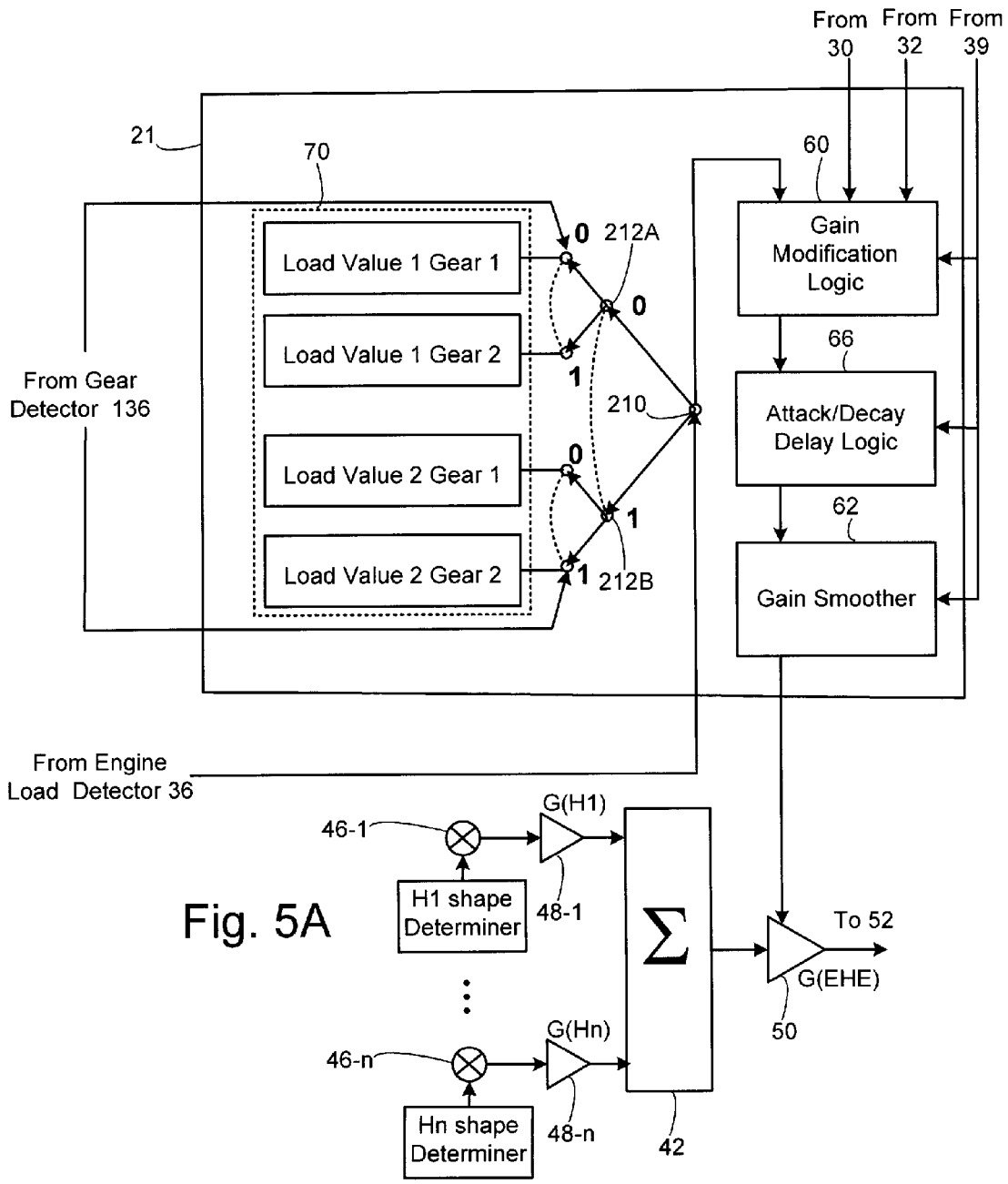
FIGS. 5A-5C are block diagrams showing EHE gain and delay determiners and other elements of an EHE processor.

FIG. 5A shows an implementation of some elements of the back end 12B-1 of EHE processor of FIG. 3A. In the implementation of FIGS. 3A and 5A, multiple parameters are used to determine one harmonic gain that is applied to all harmonics. The EHE gain and delay determiner 21 includes an LUT 70 which maps parameters (in this example engine load and gear) to gain. In this example, the LUT has four entries (2 load values×2 gear values). The EHE gain and delay determiner 21 also includes logic represented by a first switch 210 that is responsive to input from the engine load detector 36 of FIG. 2. The two output switch terminals of switch 210 are coupled to the input of switches 212A and 212B, which are responsive to input from the parameter 1 detector 136 for FIG. 2; in this implementation, parameter 1 is the gear in which the vehicle is currently operating. Inputs to H1 shape determiners 44-1 . . . 44-n are not shown in this view.

In this implementation, if switch 210 is in the "0" position, and switches 212A and 212B are in the "0" position, switch 210 outputs a gain appropriate for the engine load represented by load value 1 and for gear 1. Similarly, if switch 210 is in the "0" position, and switches 212A and 212B are in the "1" position, switch 210 outputs a gain appropriate for the engine load represented by load value 1 and for gear 2; if switch 210 is in the "1" position, and switches 212A and 212B are in the "0" position, switch 210 outputs a gain appropriate for the engine load represented by load value 2 and for gear 1; and if switch 210 is in the "1" position, and switches 212A and 212B are in the "1" position, the EHE gain and delay determiner outputs a gain and delay appropriate for the engine load represented by load value 2 and for gear 2. The process of determining an EHE gain is repeated at intervals, for example 20 ms.

The gain that is output by switch 210 is provided to the overall EHE gain element 50 through gain modification logic 60, attack/decay logic 66, and gain smoother 62. The EHE gain element 50 applies the gain and delay to the summed harmonics. The application of the gain and delay to the harmonics is repeated at intervals, for example of about 90 μs.

The gain modification logic 60 may modify the gain values based on input from RPM rate of change detector 30, RPM in-range detector 32, and engine load gain change detector 39. For example, if one or more of the RPM, the RPM rate of change, or the engine load change are out of the intended range of operation, the gain modification logic may set the gain to zero, effectively turning off the EHE system, may set the gain to 1 so the no gain is applied to the by EHE gain element 50, or may set the gain to some minimum or maximum value.

The attack/decay logic 66 may modify the gain, for example by applying a delay, to be applied by the EHE system based on input from the engine load gain change detector 39. As stated above in the discussion of engine load gain change detector 39, a more realistic effect is attained if the amplitude of the EHE signal tracks the engine load if the engine load is increasing, but decreases more gradually than the engine load if the engine load is decreasing. If the engine load is decreasing, the attack/decay logic 66 may apply a delay to the application of the gain.

The gain smoother 62 may smooth the stream of EHE gains to reduce the possibility of abrupt changes in the EHE gain. The smoothing may take the form of slewing, windowed averaging, low pass filtering, a non-linear smoothing technique, a time-varying smoothing technique, or others. In one implementation, the gain smoother 62 is a low pass filter, which can be a single pole low pass filter or a variable pole low pass filter. If the engine load is decreasing, the gain smoother may change a smoothing parameter. For example, the break frequency of a low pass filter may be changed or the width of the window in a windowed averaging system may be changed.

For simplicity of explanation and of the figures, the implementation of FIG. 5A is shown with two gears and two load values. In an actual implementation, a typical number of gears would be four to six (and possibly more if a reverse gear is included), and loads may be expressed as a percentage of maximum load in one percent intervals, for example 1%, 2% . . . 99%, 100% so there may be approximately 100 load values. Switches 210, 212A, and 212B are for explanation only, and do not indicate that the determination of the overall EHE gain must be done by switches. In an actual implementation, the determination of the overall EHE gain and delay may be done by a microprocessor selecting a value from a cell of an LUT, or, less commonly, by calculation of a formula relating the inputs to the EHE gain and delay determiner 21 with the overall EHE gain. Furthermore, the block diagrams of the figures show logical results, not necessarily the order in which operations are performed, or how the operations are performed. For example, "turning off" the EHE system could be done at gain modification logic 60 by setting the EHE gain to zero, or could be done by causing a microprocessor executing the operations of EHE gain and delay determiner 21 to temporarily stop selecting EHE gains from an LUT or by setting the EHE gain to zero.

Figure 5B:
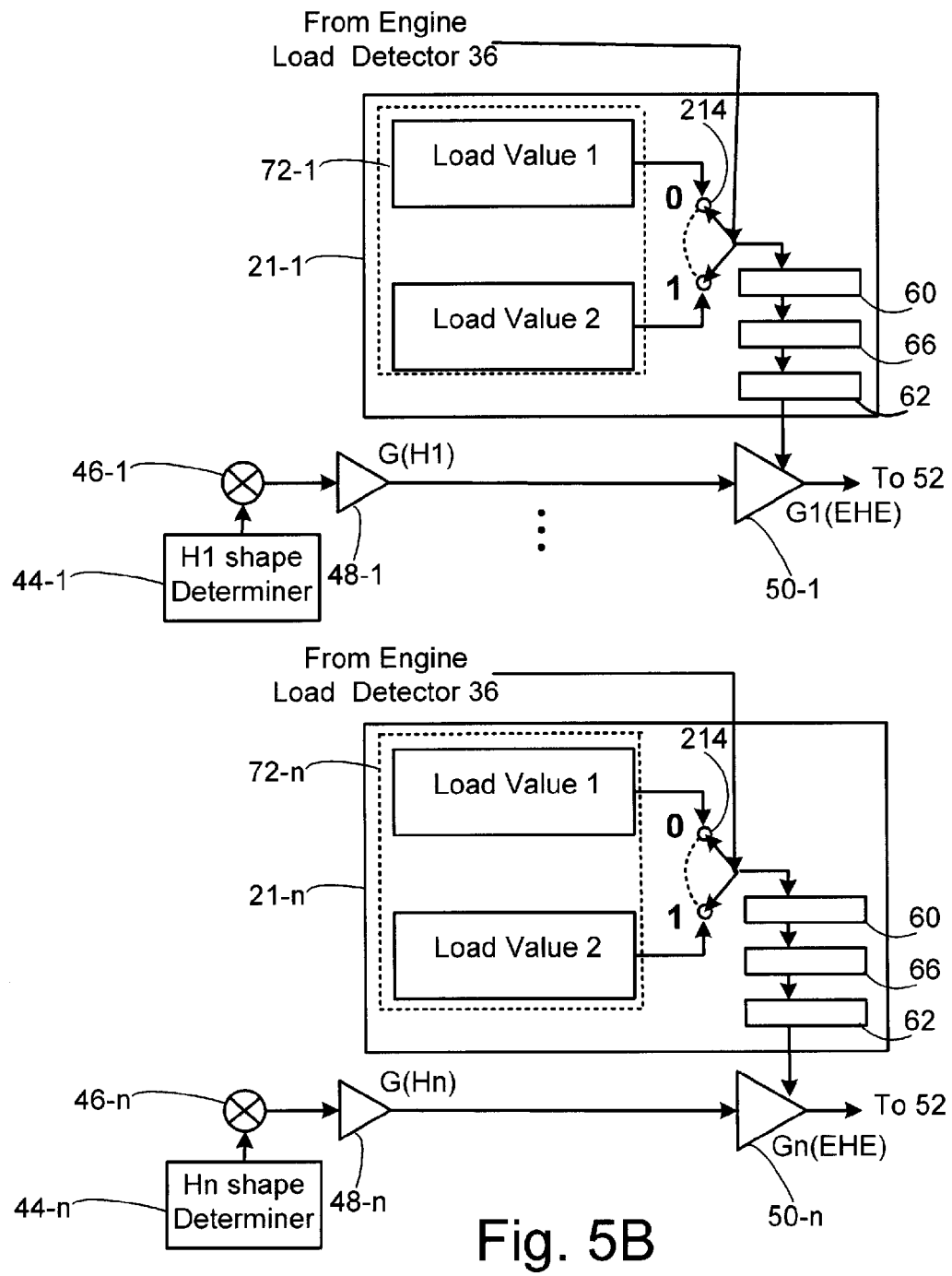

FIG. 5B shows an implementation of some elements of the back end 12B-2 of the EHE processor of FIG. 3B. Inputs to H1 shape determiners 44-1 . . . 44-n are not shown in this view nor are inputs to gain modification logic 60, attack/decay logic 66, and gain smoother 62.

In the implementation of FIGS. 3B and 5B, a single parameter is used to determine an enhancement gain for each harmonic. Each EHE gain and delay determiner 21-1-21-n includes an LUT 72-1-72, each LUT including two entries, one for each load value. Each EHE gain and delay determiner 21-1-21-$n$ also includes logic represented by a switch 214, responsive to input from the engine load detector 36 of FIG. 2. If the switch 214 of gain and delay determiner 21-1 is in the "0" position, the EHE gain and delay determiner 212 outputs an EHE gain and delay appropriate for load value 1. If the switch 214 is in the "1" position, the EHE gain and delay determiner 212 outputs an EHE gain and delay appropriate for load value 2. The gain and delay selected by the EHE gain and delay determiner is provided to the overall EHE gain element 50-1 for harmonic H1, which applies the gain and delay to harmonic H1. The remaining EHE gain and delay determiners operate in a similar manner. The EHE gain and delay for load 1 for harmonic H1 may be the same or different than the EHE gain and delay for load 1 for harmonic H2.

For simplicity of explanation and of the figures, the implementation of FIG. 5B is shown with two load values. In an actual implementation, there may be 99 or 100 load values. The use of switch 214 is for explanation only, and does not indicate that the determination of the overall EHE gain is done by switches. In an actual implementation, the determination of the overall EHE gain and delay may be done by a microprocessor selecting a value from a cell an LUT for each harmonic, or, less commonly, by calculation of a formula relating the input to the EHE gain and delay determiners 21-1-21-$n$ with the overall EHE gain for each harmonic. A typical number of harmonics for which EHE gain and delays are provided may be six, or up to twelve to eighteen if there is more than one engine mode.

Gain modification logic 60, attack/decay logic 66, and gain smoother 62 operate on the steams of gains for each harmonic in the manner described above in the discussion of FIG. 5A.

Figure 5C:
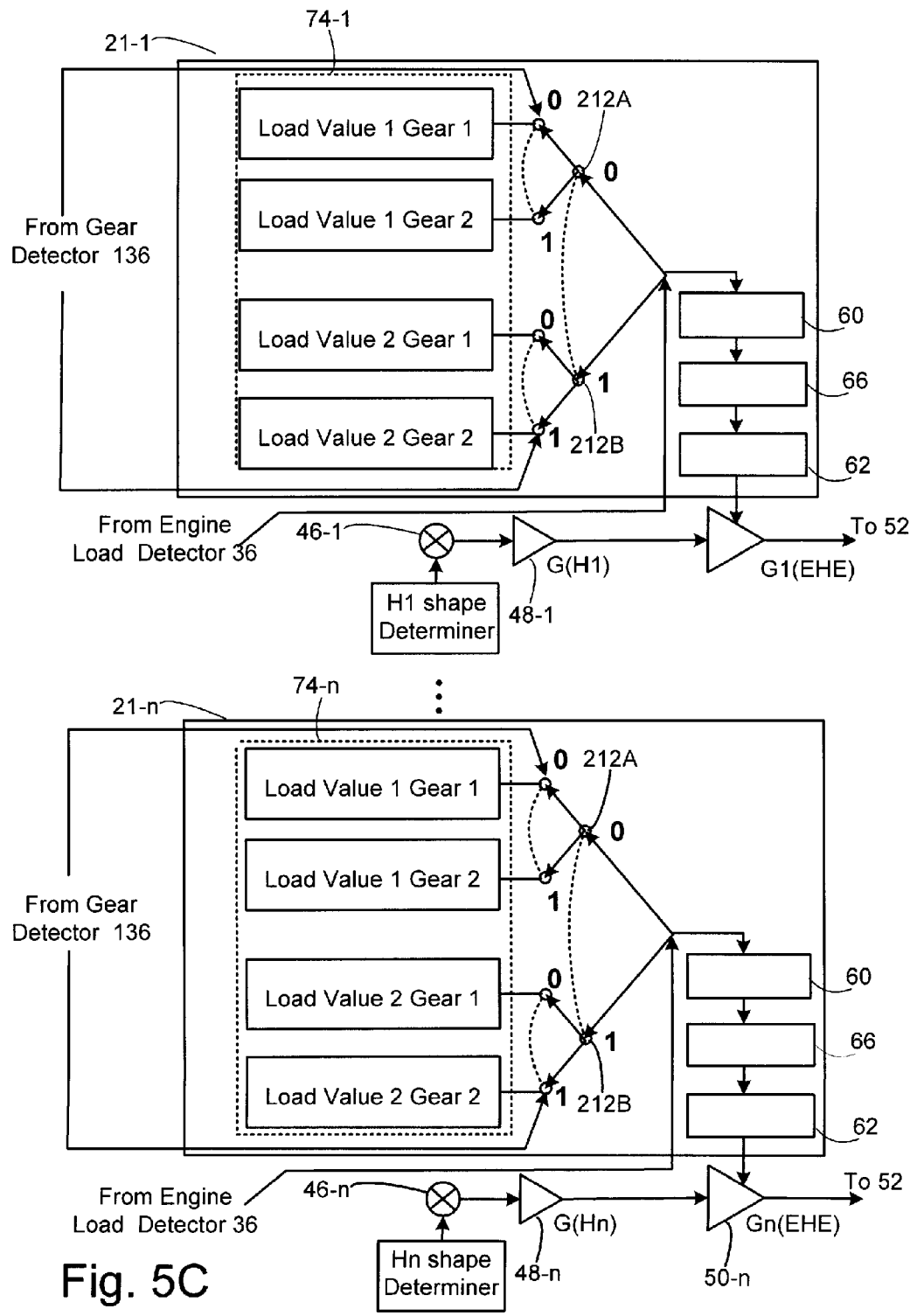

FIG. 5C shows an implementation of some elements of the back end 12B-3 of the EHE processor of FIG. 3C. In the implementation of FIGS. 3C and 5C, multiple parameters are used to determine an enhancement gain for each of the harmonics. Inputs to H1 shape determiners 44-1-44-$n$ and to multipliers 46-1-46-$n$ are not shown in this view.

Each of the EHE gain and delay determiners 21-1-21-$n$ includes an LUT (74-1-74-$n$). Each LUT includes four entries (2 load values×2 gear values). Each of the EHE gain and delay determiners 21-1-21-$n$ also includes logic represented by a first switch 210 that is responsive to input from the engine load detector 36 of FIG. 2. The two output switch terminals of switch 210 are coupled to the input of switches 212A and 212B, which are responsive to input from the parameter 1 detector 136 for FIG. 2; in this implementation, parameter 1 is the mode in which the vehicle is currently operating. (As described above, in this specification, "mode" may be a parameter of an engine that is capable of running on all cylinders or a subset of cylinders. For example, an 8 cylinder engine designed to run on 8, 6, or 4 cylinders has three modes: an 8 cylinder mode, a 6 cylinder mode, and a 4 cylinder mode. Examples of other modes are described above). The implementation of FIG. 5C has two modes. In the implementation of FIG. 5C, if switch 210 is in the "0" position, and switches 212A and 212B are in the "0" position, the EHE gain and delay determiner outputs a gain and delay appropriate for the engine load represented by load value 1 and for mode 1. Similarly, if switch 210 is in the "0" position, and switches 212A and 212B are in the "1" position, the EHE gain and delay determiner outputs a gain and delay appropriate for the engine load represented by load value 1 and for mode 2; if switch 210 is in the "1" position, and switches 212A and 212B are in the "0" position, the EHE gain and delay determiner outputs a gain and delay appropriate for the engine load represented by load value 2 and for mode 1; and if switch 210 is in the "1" position, and switches 212A and 212B are in the "1" position, the EHE gain and delay determiner outputs a gain and delay appropriate for the engine load represented by load value 2 and for mode 2. The gain and delay selected by the EHE gain and delay determiner is provided to the overall EHE gain element 50-1-50-$n$, which applies the gain and delay to corresponding harmonic H1-Hn.

For simplicity of explanation and of the figures, the implementation of FIG. 5C is shown with two modes and two load values. In an actual implementation, a typical number of modes for an LUT could be two or three and a typical number of load values for the LUT could be 99 or 100. Switches 210, 212A, and 212B are for explanation only, and do not indicate that the determination of the overall EHE gain is done by switches. In an actual implementation, the determination of the overall EHE gain and delay may be done by a microprocessor selecting a value from a cell of an LUT for each harmonic, or, less commonly, by calculation of a formula relating the inputs to the EHE gain and delay determiner 21 with the overall EHE gain for each harmonic.

Gain modification logic 60, attack/decay logic 66, and gain smoother 62 operate on the steams of gains for each harmonic in the manner described above in the discussion of FIG. 5A.

FIGS. 6-10 are three dimensional plots with the SPL on the vertical axis and the engine load and the RPM on the horizontal axes.

Figure 6:
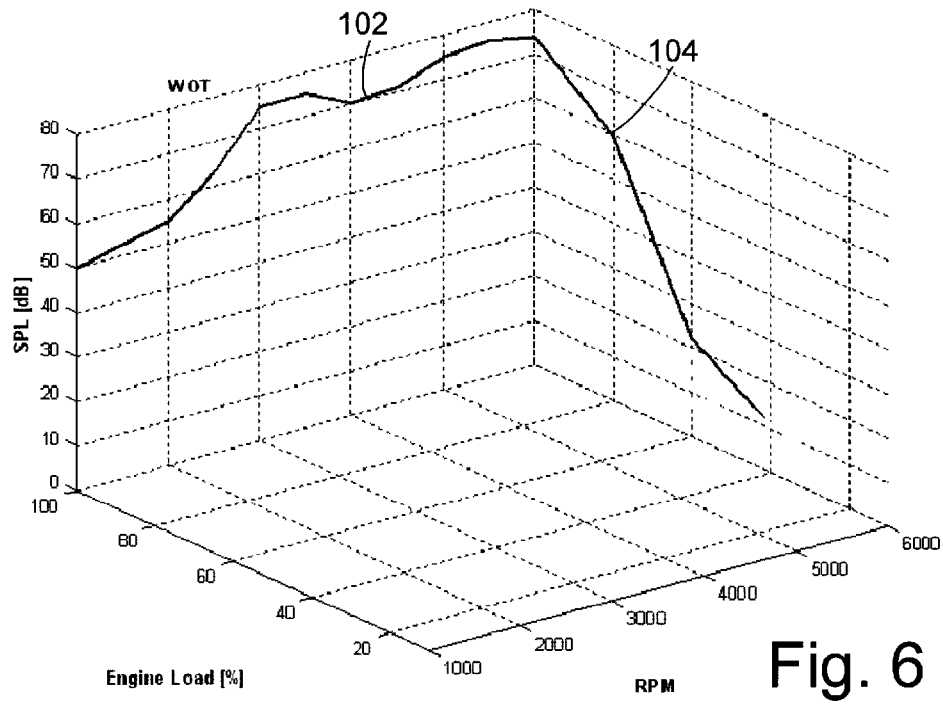
FIGS. 6-10 are three dimensional plots of sound pressure level (SPL), engine speed, and engine load.
Figure 7:
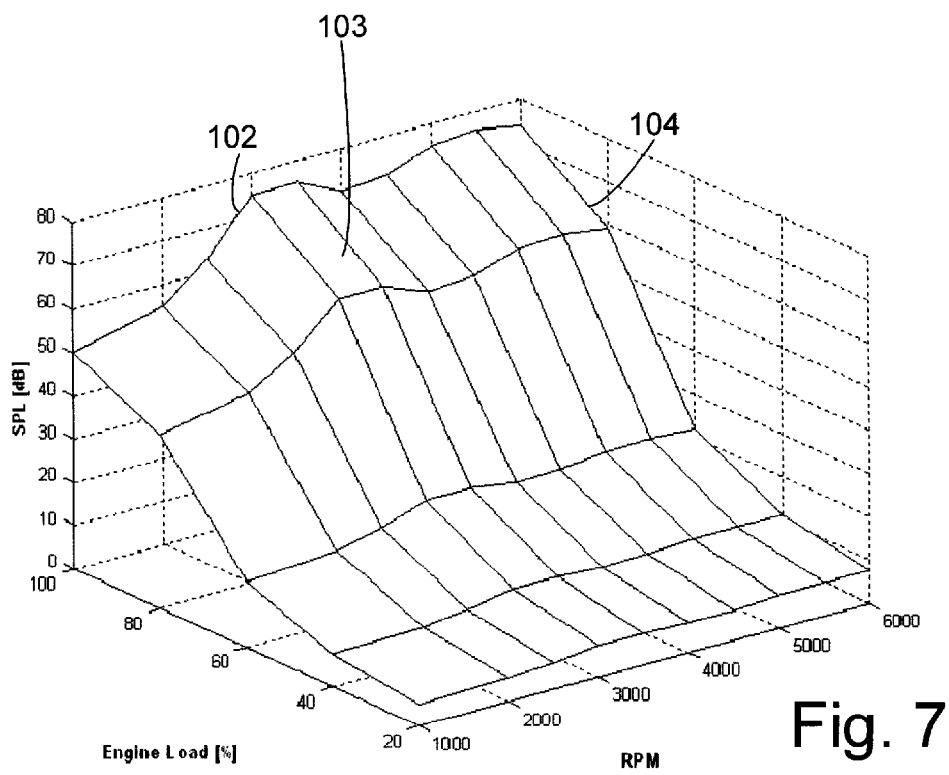

FIG. 6 shows the behavior of an EHE system in which a single parameter (typically, as in this example, engine load) determines the EHE gain, and the same gain function is applied to all frequencies and therefore to all harmonics. Curve 102 is a shows how SPL varies with RPM at 100% load (sometimes referred as wide open throttle [WOT] load). Curve 104 represents the gain function that is applied across all frequencies. The application of the gain function represented by curve 104 to curve 102 results in an enhancement surface 103 shown in FIG. 7. The surface 103 can be represented as a plurality of points, each having an RPM value, a load value, and a corresponding SPL. The points correspond to entries in an LUT. The surface 103 can also be represented as a mathematical function with two independent variables (RPM and load value), from which the SPL can be calculated or approximated.

Figure 8:
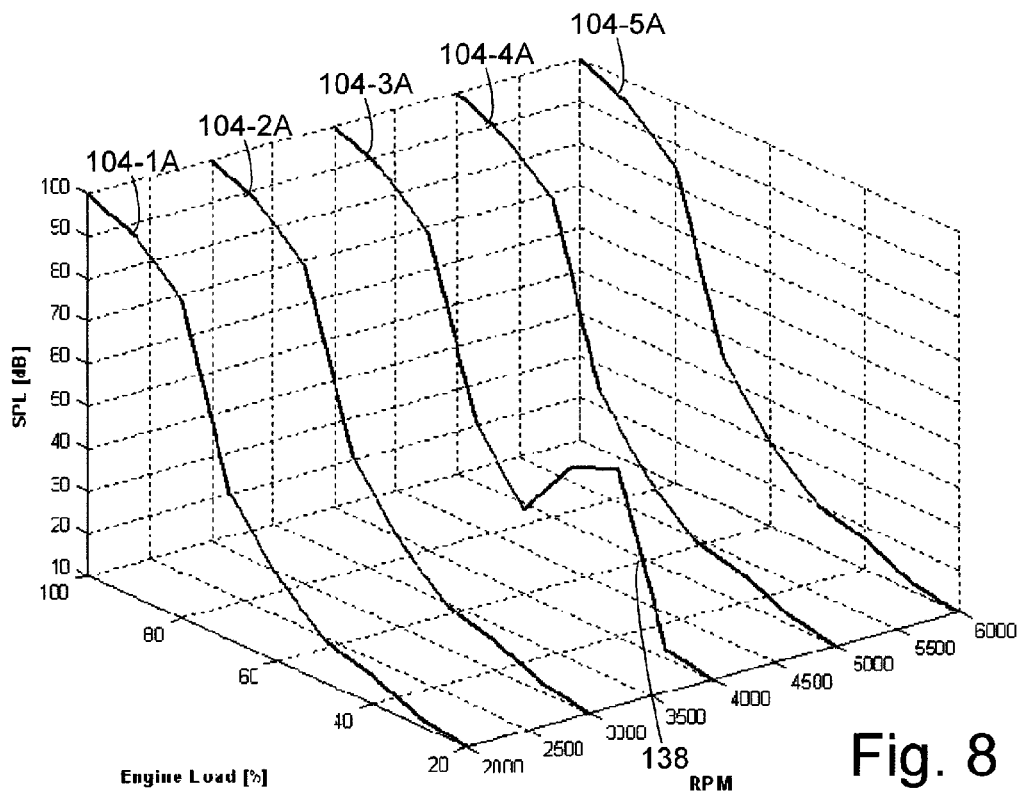

FIG. 8 shows the behavior of an EHE system in which a single parameter (typically, as in this example engine load) determines the EHE gain, but different gain function are applied at some frequencies or frequency bands.

Figure 9:
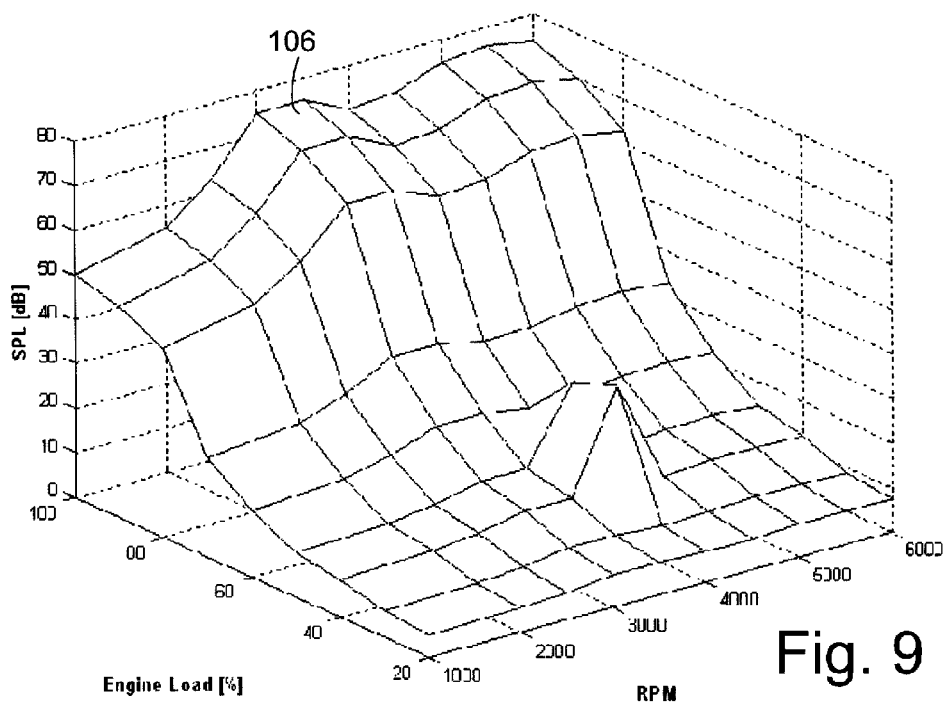

In FIG. 8, there are five different gain functions 104-1A-104-5A. In this example, gain functions 104-1A, 104-2A, 104-4A, and 104-5A are identical, but gain function 104-3A, for the RPM range from 3500 RPM to 4500 RPM, is different than gain functions 104-1A, 104-2A, 104-4A, and 104-5A. Applying the gain functions 104-1A-104-5A to the WOT curve 102 results in an enhancement surface 106 of FIG. 9. An example of an EHE system that has the behavior of FIGS. 8 and 9 is an EHE processor 12 with a back end 12B-2 of FIG. 3B. The value of n in FIG. 3B would be five; and EHE gain and delay determiners 21-1-21-5 corresponding to harmonics in the range of 3500 RPM to 4500 RPM would apply the gain function represented by curve 104-3A of FIG. 8 to determine the EHE gain to apply to the harmonic. EHE gain and delay determiners 21-1-21-5 corresponding to harmonics not in the range of 3500 RPM to 4500 RPM would apply the gain function represented by curves 104-1A, 104-2A, 104-4A, and 104-5A of FIG. 8 to determine the EHE gain to apply to the harmonic.

Figure 10:
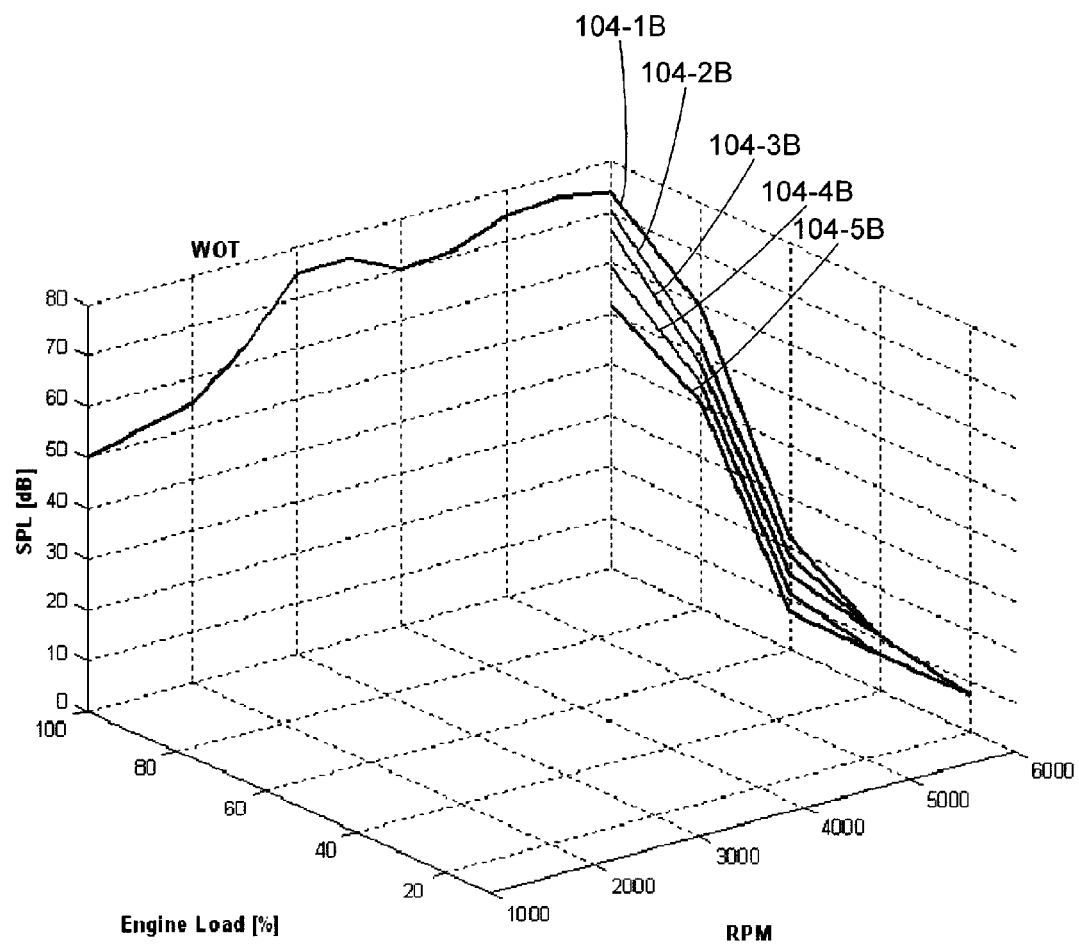

FIG. 10 shows the behavior of an EHE in which multiple parameters (in this example, engine load and gear) determine the EHE gain, and a single gain function is applied to all frequencies. In the example of FIG. 10, there are five gain functions or mappings 104-1B-104-5B, one for each gear. Applying gain functions 104-1B-104-5B to WOT curve 102 would result in five enhancement surfaces (not shown in this figure), one for each gear. An example of an EHE system that has the behavior of FIG. 10 is an EHE system with an EHE processor with a back end 12B-1 of FIG. 3A. The value of n in FIG. 3A would be five; the value of m in FIG. 2 would be two, and the two parameters would be engine load and gear. The value of the gear parameter would determine which of the five surfaces correspond to the gain function to be applied to the harmonics.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. A method, comprising:
providing a fundamental frequency corresponding to the RPM of an engine of a vehicle;
determining a plurality of harmonics of the fundamental frequency;
determining a target shape of the plurality of harmonics, the target shape comprising, for each of the harmonics of the plurality of the harmonics, a gain value as a function of the RPM of the engine;
determining an engine harmonic enhancement gain curve comprising gain values as a function of engine load; and
combining the plurality of harmonics, the target shape of the plurality of harmonics, and the engine harmonic enhancement gain curve to produce a set of harmonic enhancement signals;
wherein determining the engine harmonic enhancement gain curve comprises, for at least one of the plurality of harmonics, determining a set of gain values as a function of engine load that is different from a set of gain values as a function of engine load corresponding to the other harmonics,
wherein determining of an engine harmonic enhancement gain curve for at least one of the plurality of harmonics comprises:
determining the value of a parameter other than the engine load related to an operating condition of a vehicle; and
responsive to the value of the parameter and the engine load, determining the engine harmonic enhancement gain curve, and
wherein the parameter is a transmission ratio of a continuously variable transmission.

2. The method of claim 1, wherein the determining an engine harmonic enhancement gain curve comprises separately determining an engine harmonic gain curve for each harmonic.

3. The method of claim 1, wherein the determining the engine harmonic enhancement gain curve further comprises determining separately an engine harmonic enhancement gain curve corresponding to each of the plurality of harmonics of the fundamental engine frequency, wherein the engine harmonic enhancement gain curve corresponding to at least one of the harmonics is different that the engine harmonic enhancement gain curves corresponding to the other harmonics; and
further comprising applying to the fundamental engine frequency and to each of the plurality of harmonics of the fundamental engine frequency a corresponding engine harmonic enhancement gain curve.

4. The method of claim 3, further comprising:
determining a rate of change of the RPM of the engine of the vehicle; and
ceasing to produce the set of harmonic enhancement signals, when the rate of change of the RPM is steady or decreasing.

5. The method of claim 1 wherein producing the set of harmonic enhancement signals comprises, for each harmonic of the plurality of harmonics, combining that harmonic, the gain value of the target shape for that harmonic, and the set of gain values of the gain curve for that harmonic separately from the other harmonics.

6. An engine harmonic enhancement system, comprising:
circuitry for providing a fundamental frequency corresponding to the RPM of the engine;
circuitry for determining a plurality of harmonics of the fundamental frequency;
circuitry for determining a target shape of the plurality of harmonics, the target shape comprising, for each of the harmonics of the plurality of the harmonics, a gain value as a function of the RPM of the engine;
circuitry for determining an engine harmonic enhancement gain curve comprising gain values as a function of engine load; and
circuitry for combining the plurality of harmonics, the target shape of the plurality of harmonics, and the engine harmonic enhancement gain curve to produce a set of harmonic enhancement signals;
wherein the circuitry for determining the engine harmonic enhancement gain curve determines, for at least one of the plurality of harmonics a set of gain values as a function of engine load that is different from a set of gain values as a function of engine load corresponding to the other harmonics,
wherein the circuitry for determining of an engine harmonic enhancement gain curve for at least one of the plurality of harmonics comprises:
circuitry for determining the value of a parameter other than the engine load related to an operating condition of a vehicle; and
circuitry responsive to the value of the parameter and the engine load, for determining an engine harmonic enhancement gain curve, and
wherein the parameter is a transmission ratio of a continuously variable transmission.

7. The apparatus of claim 6, wherein the circuitry for determining an engine harmonic enhancement gain curve comprises circuitry for separately determining an engine harmonic gain curve for each harmonic.

8. The apparatus of claim 6, wherein the circuitry for determining the engine harmonic enhancement gain curve further comprises circuitry for determining separately an engine harmonic enhancement gain curve corresponding to each of the plurality of harmonics of the fundamental engine frequency, wherein the engine harmonic enhancement gain curve corresponding to at least one of the harmonics is different that the engine harmonic enhancement gain curves corresponding to the other harmonics; and
further comprising circuitry for applying to the fundamental engine frequency and to each of the plurality of harmonics of the fundamental engine frequency a corresponding engine harmonic enhancement gain curve.

9. The apparatus of claim 8, further comprising:
circuitry for determining a rate of change of the RPM of the engine of the vehicle; and circuitry for ceasing to produce the set of harmonic enhancement signals, when the rate of change of the RPM is steady or decreasing.

10. The apparatus of claim 6 wherein the circuitry for producing the set of harmonic enhancement signals combines the gain value of the target shape for each harmonic of the plurality of harmonics with the set of gain values of the gain curve for that harmonic separately from the other harmonics.

11. A method, comprising:
providing a fundamental frequency corresponding to the RPM of an engine of a vehicle;
determining a plurality of harmonics of the fundamental frequency;
determining a target shape of the plurality of harmonics, the target shape comprising, for each of the harmonics of the plurality of the harmonics, a gain value as a function of the RPM of the engine;
determining an engine harmonic enhancement gain curve comprising gain values as a function of engine load; and
combining the plurality of harmonics, the target shape of the plurality of harmonics, and the engine harmonic enhancement gain curve to produce a set of harmonic enhancement signals;
wherein determining the engine harmonic enhancement gain curve comprises:
determining a transmission ratio of a continuously variable transmission; and
responsive to the transmission ratio of the continuously variable transmission and the engine load, determining the engine harmonic enhancement gain curve.

* * * * *